US010533883B2

(12) United States Patent
Arnold et al.

(10) Patent No.: US 10,533,883 B2
(45) Date of Patent: Jan. 14, 2020

(54) THERMAL, FLOW MEASURING DEVICE WITH DIAGNOSTIC FUNCTION (71) Applicant: Endress + Hauser Flowtec AG, Reinach (CH)

(72) Inventors: Martin Arnold, Reinach (CH); Axel Pfau, Aesch (CH)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 98 days.

(21) Appl. No.: 15/535,462

(22) PCT Filed: Dec. 7, 2015

(86) PCT No.: PCT/EP2015/078806
§ 371 (c)(1),
(2) Date: Jun. 13, 2017

(87) PCT Pub. No.: WO2016/096498
PCT Pub. Date: Jun. 23, 2016

(65) Prior Publication Data
US 2017/0343401 A1 Nov. 30, 2017

(30) Foreign Application Priority Data
Dec. 19, 2014 (DE) .......... 10 2014 119 223

(51) Int. Cl.
*G01F 1/696* (2006.01)
*G01F 25/00* (2006.01)
(Continued)

(52) U.S. Cl.
CPC .......... *G01F 1/6965* (2013.01); *G01F 1/6842* (2013.01); *G01F 1/692* (2013.01); *G01F 25/0007* (2013.01)

(58) Field of Classification Search
CPC ........ G01F 1/696; G01F 1/6965; G01F 1/698; G01F 1/699; G01F 25/0007
See application file for complete search history.

(56) References Cited

U.S. PATENT DOCUMENTS 6,370,950 B1 * 4/2002 Lammerink ............ G01F 1/699
 73/204.15
6,843,110 B2 * 1/2005 Deane ..................... G01F 1/363
 73/114.35

(Continued)

FOREIGN PATENT DOCUMENTS

CN 10 2575951 B 7/2012
DE 10 2004 058 553 A1 6/2006
(Continued)

OTHER PUBLICATIONS

Office Action dated Mar. 26, 2019, in corresponding Chinese application No. 2015-80069657.6.

*Primary Examiner* — Justin N Olamit
(74) *Attorney, Agent, or Firm* — Bacon & Thomas, PLLC (57) ABSTRACT A thermal flow measuring device for determining and/or monitoring the mass flow and/or the flow velocity of a flowable medium through a pipeline, comprising at least three sensor elements and an electronics unit. Each sensor element is in thermal contact with the medium, and includes a heatable temperature sensor. The electronics unit is embodied to heat each of the three sensor elements with a heating power, to register their temperatures, to heat at least two of the at least three sensor elements simultaneously, to ascertain the mass flow and/or the flow velocity of the medium, from a pairwise comparison of the temperatures and/or heating powers and/or at least one variable derived from at least one of the temperatures and/or heating powers, to provide information concerning a change of the thermal resistance of at least one of the at least three sensor elements, (Continued)

from a response to an abrupt change of the heating power supplied to at least one of the at least three sensor elements, to provide information concerning a change of the inner thermal resistance of the at least one sensor element, and in the case that a change of the inner and/or outer thermal resistance occurs in the case of at least one of the at least three sensor elements, to perform a correction of the measured value for the mass flow and/or the flow velocity and/or to generate and to output a report concerning the state of the at least one sensor element mass flow and/or the flow velocity.

9 Claims, 6 Drawing Sheets

(51) Int. Cl.
*G01F 1/684* (2006.01)
*G01F 1/692* (2006.01)

(56) References Cited

U.S. PATENT DOCUMENTS

| | | | | |
|---|---|---|---|---|
| 8,583,385 B2 * | 11/2013 | Pfau | ................ | G01F 1/69 |
| | | | | 702/130 |
| 8,590,360 B2 * | 11/2013 | Kramer | ................ | G01F 1/698 |
| | | | | 73/1.16 |
| 9,671,266 B2 * | 6/2017 | Badarlis | ................ | G01F 1/6965 |
| 2011/0098944 A1 | 4/2011 | Pfau et al. | | |
| 2013/0283904 A1 * | 10/2013 | Arnold | ................ | G01F 1/696 |
| | | | | 73/204.25 |

FOREIGN PATENT DOCUMENTS

| | | |
|---|---|---|
| DE | 10 2005 057 687 A1 | 6/2007 |
| DE | 10 2005 057 689 A1 | 6/2007 |
| DE | 10 2009 045 956 A1 | 4/2011 |
| DE | 10 2014 119 223 B3 | 3/2016 |
| GB | 2 140 923 A | 12/1984 |
| WO | 2006 058863 A1 | 6/2006 |
| WO | WO-2013160018 A1 * | 10/2013 ........... G01F 1/6965 |

* cited by examiner

THERMAL, FLOW MEASURING DEVICE WITH DIAGNOSTIC FUNCTION

TECHNICAL FIELD

The invention relates to a thermal, flow measuring device, especially a thermal, flow measuring device for determining and/or monitoring the mass flow and/or the flow velocity of a flowable medium through a pipeline, comprising at least three sensor elements and an electronics unit, as well as to a method for operating such a flow measuring device. Furthermore, information concerning the state of at least one of the at least three sensor elements can be provided. The flow measuring device thus includes a diagnostic function.

BACKGROUND DISCUSSION

Thermal flow measuring devices are widely applied in process measurements technology. Corresponding field devices are manufactured and sold by the applicant, for example, under the marks, t-switch, t-trend or t-mass. The underpinning measuring principles are known from a large number of publications.

Typically, a flow measuring device of the field of the invention includes at least two sensor elements, of which each has a temperature sensor embodied as equally as possible. At least one of the sensor elements is embodied heatably. In this regard, a sensor element can contain a supplemental resistance heater. Alternatively, however, the temperature sensor can also be embodied as a resistance element, e.g. in the form of an RTD resistance element (Resistance Temperature Detector), especially in the form of a platinum element, such as also commercially obtainable under the designations PT10, PT100, and PT1000. The resistance element, also referred to as resistance thermometer, is then heated via conversion of electrical power supplied to it, e.g. as a result of an increased electrical current supply.

Often, the temperature sensor is arranged within a cylindrical shell, especially a shell of metal, especially stainless steel or Hastelloy. The shell functions as a housing, which protects the temperature sensor, for example from aggressive media. In the case of the particular at least one heatable temperature sensor, it must additionally be assured that a best possible thermal contact is provided between the heatable temperature sensor and the shell.

For registering the mass flow and/or the flow velocity, the at least two sensor elements are introduced into a pipeline, through which flows, at least at times and at least partially, a flowable medium. The sensor elements are in thermal contact with the medium. They can, for this, either be integrated directly into the pipeline, or into a measuring tube installable in an existing pipeline. Both options are subject matter of the present invention, even when in the following only a pipeline is discussed.

In operation, at least one of the at least two temperature sensors is heated (the active temperature sensor) while the second temperature sensor remains unheated (the passive temperature sensor). The passive temperature sensor is applied for registering the temperature of the flowable medium. The terminology, temperature of the medium, means, in such case, the temperature, which the medium has without an additional heat input of a heating unit. The active sensor element is usually either so heated that a fixed temperature difference is established between the two temperature sensors, wherein the change of the heating power is taken into consideration as measure for the mass flow and/or the flow velocity. Alternatively, however, also the fed heating power can be kept constant, so that the corresponding temperature change is taken into consideration for determining the mass flow and/or the flow velocity.

If no flow is present in the pipeline, the removal of the heat from the active temperature sensor within the medium occurs via heat conduction, heat radiation and, in given cases, also via free convection. For maintaining a certain temperature difference, then, for example, a constant amount of heat is required as a function of time. In the presence of a flow, in contrast, there is an additional cooling of the active temperature sensor from the flow of the flowing, colder medium. An additional heat transport occurs due to forced convection. Correspondingly, thus, as a result of a flow, either an increased heating power must be supplied, in order to maintain a fixed temperature difference, or else the temperature difference between the active and passive temperature sensors lessens.

This functional relationship between the heating power supplied to the active temperature sensor, or the temperature difference, and the mass flow and/or the flow velocity of the medium through the pipeline can be expressed by means of the so-called heat transfer coefficient. The dependence of the heat transfer coefficient on the mass flow of the medium through the pipeline is then used for determining the mass flow and/or the flow velocity. Along with that, the thermophysical properties of the medium as well as the pressure reigning in the pipeline have an influence on the measured flow. In order also to take into consideration the dependence of the flow on these variables, the thermophysical properties are, for example, furnished within an electronics unit of the flow measuring device in the form of characteristic curves or as parts of functional, determinative equations.

It is not possible by means of a thermal, flow measuring device to distinguish directly between a forwards directed and a backwards directed flow. In such case, the terminology, flow direction, means, here the macroscopic flow direction, such that partially occurring vortex or directional deviations are not taken into consideration. If the flow direction is not known, then especially in the case of flow not constant as a function of time or also very small flows, considerable measurement errors can disadvantageously be experienced in the determining of mass flow and/or flow velocity.

Various thermal, flow measuring devices have been developed and disclosed, which have, besides the determining of mass flow and/or flow velocity, a supplemental functionality for flow direction detection. For ascertaining the flow direction, frequently utilized is the fact that different local flows, which directly surround the particular sensor element, lead to different cooling rates of the respective sensor element in the case of respectively equal supplied heating power. Different local flows can be implemented, for example, by integrating a bluff body into the pipeline in the direct vicinity of at least one of the at least two sensor elements, by a non-equivalent arrangement of the at least two sensor elements with reference to the flow profile, or also by different geometric embodiments of the at least two sensor elements.

In the case of the flow measuring device of German patent publication, DE102010040285A1, for example, a plate is arranged within a measuring tube on a connecting line between a first and a second heatable temperature sensor. Based on comparison of so-called decision coefficients, which result from the respective heating powers and temperatures of the at least two heatable temperature sensors, then the flow direction of the medium is ascertained. These decisions coefficients are likewise taken into consideration in German patent publications DE102009045956A1 and DE102009045958A1 for determining the flow direction. In such case, the flow measuring device of German patent publication DE102009045956A1 includes a flow guiding body, which is arranged together with a heatable temperature sensor in a line essentially parallel to the pipeline axis, and a further temperature sensor is arranged spaced therefrom. In contrast, in the case of the flow measuring device of German patent publication DE102009045958A1, at least two heatable temperature sensors are arranged in two sleeve sections, and the at least two sleeve sections point in at least two directions with reference to the measuring tube axis.

In German patent publication DE102007023840B4, a thermal, flow measuring device with flow direction detection is described, which includes at least three sensor elements, whereof two sensor elements are arranged one after the other in the flow direction and at least one of these two sensor elements is heated, and at least at times in reference to the flow direction the heated sensor is arranged in front of the non-heated sensor element, and at times the non-heated sensor is arranged in front of the heated sensor element. The third sensor element is, furthermore, periodically temporarily heatable and arranged outside the flow across the first two sensor elements. The deviation of the respectively won measured values is then a measure for the flow direction of the medium.

Other causes for an, in given cases, considerable, measured value corruption lie, for example, in a change of the thermal resistance of at least one of the utilized sensor elements, which can lead to a change of the heat transfer from the heating unit into the medium in the case of otherwise constant flow conditions. Such a change of the thermal resistance is also referred to as sensor drift. In given cases, when the change of the effective thermal resistance remains below a certain predeterminable limit value, and in case the change is detected, the sensor drift as well as the negative influence on the determining of the mass flow and/or the flow velocity can at least partially be removed by suitable countermeasures. Otherwise, in given cases, the flow measuring device must at least partially be replaced.

Fundamentally with reference to the thermal resistance, a distinction is made between an inner thermal resistance and an outer thermal resistance. The inner thermal resistance depends, among other things, on individual components within the sensor element, e.g. within the sleeves. Thus, sensor drift can arise from defects in solder connections due to tensile loads from material expansion or the like. The outer thermal resistance is, in contrast, influenced by accretion, material removal or material transformation (e.g. corrosion) on the surfaces of the respective sensor element contacting the medium. A change of the outer thermal resistance is, thus, especially relevant in the case of long periods of operation and/or contact with aggressive media. In the case of gaseous- or vaporous media, the measuring of mass flow or flow velocity can, moreover, also be degraded by condensate formation on at least one of the temperature sensors.

Known from the state of the art are a number of flow measuring devices, by means of which a diagnosis concerning at least one of the sensor elements can be actuated. Thus, information concerning the state of at least one of the sensor elements is provided.

German patent publication DE102005057687A1 describes a thermal, flow measuring device having at least two heatable temperature sensors, wherein the first temperature sensor and the second temperature sensor are alternately operable as a passive, non-heated temperature sensor, which during a first measurement interval provides information concerning the current temperature of the medium, and as an actively heated temperature sensor, which during a second measurement interval provides information concerning the mass flow of the medium through the pipeline. A control/evaluation unit issues a report and/or undertakes a correction, as soon as the corresponding measured values of the two temperature sensors provided during the first measurement interval and the second measurement interval deviate from one another. In this way, accretion and condensate formation can be recognized.

Similarly, disclosed in German patent publication DE102007023823A1 is a thermal, flow measuring device having two, phasewise alternately heatable sensor elements as well as method for its operation. The mass flow is, in such case, alternately ascertained based on the respectively heated sensor element, wherein the respectively non-heated sensor element is referenced for ascertaining the temperature of the medium. From a comparison of the measured values with the two sensor elements, supplementally, a fouling of at least one of the two sensor elements can be detected.

Described in U.S. Pat. No. 8,590,360 B2 is the heating or cooling of a first heatable sensor element with a first heating power, and simultaneously the heating or cooling of a second heatable sensor element with a second heating power. Typically, the two heating powers are so selected that the temperatures of the two sensor elements differ. Through a comparison of the temperature of the medium, and/or of at least two independent variables characterizing the heat transfer coefficient, then a diagnosis can be made concerning the flow measuring device.

Finally, known from published international patent application, WO/2008/142075A1 is a method, in the case of which the heatable temperature sensor in thermal contact with a medium is heated with an alternating electrical current- or voltage signal and the produced heat at least partially given off to the flowing medium. The course of a heat- and/or cooling process occurring within the temperature sensor is measured and therefrom the state of the temperature sensor, especially a fouling and/or an accretion thereof, is diagnosed. At the same time, the mass flow can be determined.

In principle, the described flow measuring devices with a diagnostic function detect a change of the thermal resistance. Based on that, then the presence of accretion—and/or condensate formation can be deduced. This corresponds to a change of the external thermal resistance. As described above, a sensor drift can, however, also be brought about by a change of the inner thermal resistance. The inner thermal resistance is determined by the construction and materials used within the respective sensor element, especially by the different components e.g. within the sleeves, or housing, or by various material connections and/or—transitions, such as e.g. soldered connections. It would thus be desirable to provide a diagnostic function, by means of which, in the case of a sensor drift in at least one of the at least three sensor elements, it could be distinguished between a change of the outer thermal resistance and the inner thermal resistance.

Most of these flow measuring devices, which are suited for diagnosis of an accretion- and/or condensate formation or for providing information concerning the state of at least one sensor element, are, however, not able, simultaneously, to ascertain the flow and the diagnosis, or, simultaneously, the flow and the flow direction, or both. In the case of the respectively applied measuring principles, the individual sensor elements are at times heated, and serve at times for registering the temperature of the medium. Correspondingly, at each change of the temperature for one of the sensor elements, it is necessary to wait for the next measured value registering until the new temperature has, in each case, become stable. Thus, for example, the mass flow and/or the flow velocity cannot be continuously determined. Correspondingly, the methods assume an almost constant flow rate of the medium through the pipeline, at least during the time required for reaching a stable new temperature by at least one sensor element. However, it is in practice frequently the case that the flow rates vary at least slightly with time, which then can lead to a corrupted measurement result. This is especially problematic in the case of high flow rates.

SUMMARY OF THE INVENTION

Starting from the above described state of the art, an object of the present invention is a thermal, flow measuring device as well as a method for operating a corresponding flow measuring device, by means of which the mass flow and/or the flow velocity can be determined as exactly as possible.

Regarding the apparatus, the object is achieved by a thermal, flow measuring device for determining and/or monitoring the mass flow $\Phi_M$ and/or the flow velocity $v_F$ of a flowable medium through a pipeline, comprising at least three sensor elements and an electronics unit,
wherein each of the at least three sensor elements
is at least partially and/or at times in thermal contact with the medium, and
includes a heatable temperature sensor, and
wherein the electronics unit is embodied,
to heat each of the three sensor elements with a heating power,
to register their temperatures,
to heat at least two of the at least three sensor elements simultaneously,
to ascertain the mass flow $\Phi_M$ and/or the flow velocity $v_F$ of the medium,
from a pairwise comparison of the temperatures and/or heating powers of the at least three sensor elements and/or at least one variable derived from at least one of the temperatures and/or heating powers, to provide information concerning a change of the thermal resistance of at least one of the at least three sensor elements,
from a response to an abrupt change $\Delta P$ of the heating power supplied to at least one of the at least three sensor elements to provide information concerning a change of the inner thermal resistance of the at least one sensor element, and
in the case that a change of the inner and/or outer thermal resistance of at least one of the at least three sensor elements occurs, to perform a correction of the measured value for the mass flow $\Phi_M$ and/or the flow velocity $v_F$ and/or to generate and to output a report concerning the state of the at least one sensor element.

The supplied heating power can, in such case, be either constant, thus correspond to a fixed value, or adjustable, in such a manner that in ongoing operation the supplied heating power can be changed and/or controlled.

The electronics unit must then be able to heat each of the three sensor elements independently of one another, as well as at least two simultaneously. At least one of the sensor elements remains, furthermore, unheated and serves for registering the temperature of the medium. In the case, in which for determining the mass flow and/or the flow velocity a constant temperature difference is set between at least one heated sensor element and that, which displays the temperature of the medium, the electronics unit should have at least two control units for controlling the heating power supplied to each of the heated sensor elements. Thus, for example, one of the at least two heated sensor elements can be applied for ascertaining the mass flow and/or the flow velocity and the other for diagnosis. Advantageously, a separate control unit is present for each of the heated sensor elements, in order that in ongoing operation any combination of heated and non-heated sensor elements is selectable. If the mass flow and/or the flow velocity is, however, determined from the temperature difference, which results between a heated and an unheated sensor element in the case of supplying a constant heating power, then each of the three sensor elements should individually be able to be fed a determinable, however, constant heating power. It is then possible to compare both the temperature differences between, in each case, one of the heated sensor elements and that which registers the temperature of the medium, as well as also the temperature differences between two sensor elements heated to different temperatures.

In this way, that each of the at least three sensor elements is individually heatable, and thereby, that, in each case, at least two of the at least three sensor elements are simultaneously heatable, the mass flow and/or the flow velocity can be continuously and very exactly determined. At the same time, a diagnosis, thus information concerning the state of at least one of the at least three sensor elements, is possible. A further advantage in reference to a flow measuring device of the invention is that not only information is possible that at least one of the at least three sensor elements shows a sensor drift, but also which of the at least three sensor elements is affected. Then, in the case of sensor drift at one of the sensor elements, the flow can nevertheless still be exactly determined. If, for example, sensor drift is detected in the case of a first sensor element, it is possible without interruption to switch to a second sensor element for determining the mass flow and/or flow velocity.

Advantageously furthermore, a change of the inner thermal resistance of the at least one sensor element can be determined from the response. This provides information concerning the functional ability of a sensor element, or concerning the state of individual components e.g. within the sleeves, or also concerning soldered connections. Advantageously, a thermal flow measuring device of the invention thus enables distinguishing between a change of the inner thermal resistance and the outer thermal resistance. Therewith, not only the sensor element can be identified, in the case of which a sensor drift is occurring, but also the cause for the sensor drift can be detected.

The diagnostic function can further advantageous be performed during operation of the flow measuring device. The measuring device does not have to be deinstalled for this. Also, medium can flow through the pipeline while the diagnostic function is being performed.

The abrupt change $\Delta P=P_1-P_2$ of the supplied heating power can be positive or negative. Correspondingly, the response of the at least one sensor element can be registered, for example, after a previously unheated sensor element is heated starting at a certain point in time, or also, conversely, after the heating power to a sensor element is turned off. However, the response can also be recorded in the case of a change $\Delta P$ of the supplied heating power from a first value to a second value. Important is that the change $\Delta P$ of the supplied heating power occurs abruptly, and not continuously or continuously controlled. An electronics unit of the invention must correspondingly be embodied to record a response, thus have a sufficiently high sampling rate for registering the measured variable, whose response is to be recorded and analyzed. Ideally, the sampling rate should lie in the region of milliseconds or less. Of concern is thus a method simply implementable in a measuring device.

Performing an analysis of a response of the at least one sensor element for diagnostic purposes involves features as follows: an abrupt change $\Delta P$ of the supplied heating power likewise changes abruptly the heat transported from the heating unit within the sensor element to its surface, thus the heat propagation. This heat transport depends quite generally on various factors and various physical, chemical and material-specific parameters, especially the thermophysical material properties, such as, for example, the density $\rho$, the thermal conductivity $\lambda$, the specific heat capacity c and also the thermal diffusivity a of the particular material or materials. However, also the geometry of the respective component as well as material transitions play a role. In the real case, however, still other effects related to the aging of the sensor element and influencing the heat transport enter into consideration, such as, for example, thermal and/or mechanical loadings.

Up to the point in time, when the transported heat reaches the surface of the sensor element, the heat transport is defined only by the mentioned variables. From the moment, when the transported heat reaches the surface of the sensor element, the heat transport is dominated, in contrast, by the medium flowing past the sensor element. The analysis of the response, since it concentrates on the period of time, during which the transported heat has not yet reached surface of the sensor element, thus gives information concerning a change of the inner thermal resistance.

In an especially preferred embodiment, the electronics unit is embodied to determine the flow direction of the flowable medium. A flow measuring device corresponding to this embodiment offers then, thus, besides the supplemental functionality of being able to provide a diagnosis, e.g. information concerning the state of at least one sensor element, also a flow direction detection. This increases the achievable accuracy of measurement yet further.

Another embodiment includes that the electronics unit is embodied, without interruption, thus continuously, to ascertain the mass flow and/or the flow velocity, to determine the flow direction of the medium and/or to provide information concerning the inner and/or outer thermal resistance of at least one of the at least three sensor elements.

It is advantageous when at least one of the at least three sensor elements has a first embodiment with reference to the geometry, construction and material, and at least a second of the at least three sensor elements has a second embodiment different from the first. It is, furthermore, advantageous, when at least two of the at least three sensor elements are arranged at first positions within the pipeline equivalent with reference to locally surrounding flow of the medium, and wherein at least one of the at least three sensor elements is arranged at a second position within the pipeline different from the first positions with reference to locally surrounding flow of the medium. The different geometric embodiments and/or arrangements of the individual sensor elements within the pipeline means also that the cooling rate brought about by the flow of the medium is different for each of the sensor elements. This is especially advantageous for detecting the flow direction, however, also for the diagnosis concerning sensor drift. The reason for this is that the characteristic curves, respectively the functional dependencies between the temperatures, the supplied heating powers, as well as the thermophysical properties and also other parameters of the individual sensor elements differ for forwards and backwards directed flow.

In a preferred embodiment, at least one of the at least three sensor elements is arranged with reference to the longitudinal axis of the pipeline in the direct vicinity before or behind a bluff body, or other flow influencing module. In such case, it is advantageous, when the cross sectional area of the bluff body is a triangle, a rectangle, a parallelogram, a trapezoid, a circle or an ellipse. By this measure, the local flow profile surrounding the particular sensor element is changed, with targeting, in comparison to a sensor element not arranged behind a bluff body, or in comparison to a sensor element arranged behind a bluff body of different geometry. The effect achieved by integration of a bluff body is, in such case, as a rule, greater than that, which results from different geometric embodiments or arrangements.

In a preferred embodiment, the at least one sensor element includes a housing, especially a housing of metal, especially stainless steel or Hastelloy, wherein in the interior of the housing at least the temperature sensor, especially an RTD resistance element, is arranged in such a manner that the housing and the temperature sensor are in thermal contact. The housing protects the sensor element against damage. Especially in the case of use in aggressive media, such protection is highly advantageous.

In an especially preferred embodiment, the thermal, flow measuring device includes exactly three sensor elements, wherein at least one of the three sensor elements is arranged in the direct vicinity of a bluff body, or another flow influencing module. In such case, it is advantageous, when the first and second sensor elements are arranged symmetrically on oppositely lying sides of an imaginary axis parallel to the pipeline, wherein the third sensor element is arranged on the imaginary axis, and wherein between the imaginary connecting line through the first and the second sensor elements and the third sensor element a bluff body is arranged, whose separation from the third sensor element is less than that from the imaginary connecting line.

Advantageously, the electronics unit includes a memory unit, in which at least one reference for a response of the sensor element to an abrupt change of the supplied power in the functional state is stored. This reference curve can be installed during the manufacturing or parametering of the flow measuring device. The analysis of the response can then be performed by a comparison of a measured curve with a reference curve furnished in the memory unit, for example, by a comparison of the respective function values at certain predeterminable characteristic points in time.

Furthermore, it is advantageous, when the electronics unit is so embodied that it can register at least 100 measured values in a time interval of typically less than 100 ms. This specification for a minimum sampling rate of the measured variable, whose response is analyzed, assures that a sufficient number of measured values are registered in the short time interval available for registering the response.

The object of the invention is, furthermore, achieved by a method for operating, in a normal operating mode and in a diagnostic mode, a thermal, flow measuring device for determining and/or monitoring the mass flow $\Phi_M$ and/or the flow velocity $v_F$ of a flowable medium through a pipeline and having at least three sensor elements and an electronics unit, especially as claimed in at least one of the preceding claims, wherein in the normal operating mode at least one of the at least three sensor elements is heated with a tunable heating power, and its temperature registered, and the mass flow $\Phi_M$ and/or the flow velocity $v_F$ of the medium is determined, and wherein in the diagnostic mode at least steps are performed as follows:
- a first sensor element is heated with a first heating power and its temperature registered,
- a second sensor element is heated with a second heating power and its temperature registered,
- the temperature of the medium is registered by means of a non-heated, third sensor element,
- from the heating power and/or temperature of the first or second sensor element and/or at least one variable derived from at least one of these variables, the mass flow $\Phi_M$ and/or the flow velocity $v_F$ of the medium is determined,
- from a pairwise comparison of the temperatures and/or heating powers of the first and/or second sensor element and the temperature of the third sensor element and/or from at least one variable derived from the temperatures and/or heating powers, information is derived concerning a change of the thermal resistance of at least one of the at least three sensor elements,
- from a response to an abrupt change $\Delta P$ of the heating power supplied to at least one of the at least three sensor elements, information is derived concerning a change of the inner thermal resistance of the at least one sensor element, and
- correction of the measured value for the mass flow $\Phi_M$ and/or the flow velocity $v_F$ is performed and/or a report concerning the state of at least one of the at least three sensor elements generated and output.

In this way, mass flow and/or a flow velocity can be continuously and exactly determined. At the same time, a diagnosis, thus information concerning a change of the outer and/or inner thermal resistance of at least one of the at least three sensor elements, is available. The diagnosis is not just limited to information that the thermal resistance of at least one of the sensor elements has changed. The method of the invention enables, in given cases, rather, to provide information concerning which of the three sensor elements has a changed thermal resistance, or in the case of which the thermal resistance is still constant. Since, moreover, a change of the inner thermal resistance can be distinguished from a change of the outer thermal resistance, not only the sensor element, in the case of which a sensor drift has occurred, can be identified, but also the cause for the sensor drift can be detected.

In such case, the supplied heating powers and/or the temperatures for at least two simultaneously heated sensor elements can be tuned either to the same value or to different values. Moreover, the abrupt change of the supplied heating power can be positive or negative.

A preferred variant of the method of the invention provides that the flow direction of the medium is ascertained from a pairwise comparison of the temperatures and/or heating powers and/or from at least one variable derived from the temperatures and/or heating powers.

In an additional preferred embodiment of the method, the mass flow, the flow velocity, the flow direction of the medium and/or information concerning the state of at least one of the at least three sensor elements are ascertained without interruption and at the same time.

It is, furthermore, advantageous, when, before the simultaneous heating of at least two of the at least three sensor elements with, in each case, a tunable heating power, a reconciliation of the measured media temperatures is performed, and, in given cases, a temperature correction term calculated and applied to all following measurements. In such case, the following cases can be considered: at start-up of the flow measuring device, a first and a second sensor element are heated. Before these sensors elements are supplied a heating power, the temperature of the medium is determined with both, or even with all sensor elements. If the values measured independently of one another deviate from one another, a temperature correction term is calculated. In this way, measured values deviating due to unpreventable manufacturing tolerances and differences in the respective calibrations can be canceled. Another case occurs when, during operation, the heated sensor elements are changed back and forth, so that a further temperature comparison is performed. In such case, of concern can be either the temperature of the medium or the temperatures at equal, supplied heating powers.

A preferred embodiment provides that a comparison of the power coefficients PC of the at least three sensor elements is performed. The power coefficient PC results from a comparison of the heating power P supplied to a heatable sensor element S, as well as its temperature T, with the temperature of the medium $T_M$ ascertained by means of an additional unheated sensor element $S_M$ and is defined as $$PC(S, S_M) = \frac{P}{T - T_M}.$$

Advantageously evaluated is the response of a characteristic measured variable of the sensor element dependent on the heating power, especially a variable such as the temperature or the electrical resistance. These variables are especially simple to register. The temperature, for example, is registered in any event in a thermal flow measuring device.

An especially preferred embodiment includes that the response of the temperature $T(t)$ and/or of the resistance $R(t)$ of the at least one sensor element is recorded as a function of time and, by means of a comparison of the recorded response of the temperature and/or of the resistance of the at least one sensor element with at least one reference response of the temperature and/or of the resistance, a change of the thermal resistance of the at least one sensor element is deduced, and, wherein, upon the exceeding of a predeterminable limit value for the change of the thermal resistance, a report concerning a malfunction of at least one sensor element is generated and output. As soon as the heat generated by the heating unit reaches the surface of the at least one sensor element, the curve of the temperature, or of the electrical resistance, changes as a function of the outer heat transfer coefficient and/or the outer flow conditions.

In an additional especially preferred embodiment, the gradient of the temperature and/or of the resistance is ascertained, wherein, by means of comparison of the gradient of the response of the temperature and/or of the resistance, and/or a variable of the at least one sensor element derived therefrom, with the gradient of at least one reference response of the temperature and/or of the resistance, a change of the thermal resistance of the at least one sensor element is deduced, and wherein, upon the exceeding of a predeterminable limit value for the change of the thermal resistance, a report concerning a malfunction of at least one sensor element is generated and output. The consideration of the measured response and the reference response, in given cases, makes the changes between them much more visible.

Fundamentally, it is advantageous when the time interval for recording the response of the temperature T(t) and/or of the resistance R(t) is selected in such a manner that it is less than the time, which the heat supplied by means of the abrupt change of the heating power requires, in order to travel from the interior of the sensor element to its surface. Based on suitable estimates, a maximum expected time span for the heat transport within the at least one sensor element can be established. This saves the storing of unnecessary measured values, which are recorded at a point in time, in which the heat transport is already dominated by the flowable medium, and, associated therewith, the capacities of the thermal flow measuring device with reference to the provided computing power are reduced.

Another preferred embodiment of the method is designed for a thermal, flow measuring device with exactly three sensor elements and includes method steps as follows:

In the normal operating mode, the first sensor element is fed a first heating power, its temperature registered, and the mass flow and/or the flow velocity determined,
in a first time interval of the diagnostic mode
the first and second sensor elements are heated,
the mass flow and/or the flow velocity are determined based on the first sensor element, and
a comparison of the power coefficients PC(S1,S3) and PC(S2,S3) performed,
in a second time interval of the diagnostic mode
the first and third sensor elements are heated,
the mass flow and/or the flow velocity are determined based on the first sensor element, and
a comparison of the power coefficients PC(S1,S2) and PC(S3,S2) performed, and the direction of the flowing medium ascertained therefrom, and
in a third time interval of the diagnostic mode
the second and third sensor elements are heated,
the mass flow and/or the flow velocity are determined based on the second sensor element, and
a comparison of the power coefficients PC(S2,S1) and PC(S3,S1) performed, and the direction of the flowing medium ascertained therefrom.

In each of the three time intervals, thus, another of the at least three sensor elements remains unheated and serves for registering the temperature $T_M$ of the medium. Based on the comparisons of the different power coefficients in the three time intervals, then information is derived concerning the state of at least one of the at least three sensor elements and a correction of the measured value for the mass flow and/or the flow velocity performed and/or a report concerning the state of the at least one sensor element generated and output.

In such case, it is advantageous, when at least one change of the heating power supplied to at least one of the at least three sensor elements, especially for the case, in which an earlier not heated sensor element is heated, or for the case in which an earlier heated sensor element is no longer heated, is in the form of an abrupt change of the heating power supplied to the particular sensor element, wherein, from the response of the particular sensor element to this abrupt change of the heating power, information is derived concerning the inner thermal resistance of the particular sensor element. For example, before the start of one of the three time intervals, an analysis of a response for at least one of the at least three sensor elements can be performed.

Of course, in the case, in which the thermal, flow measuring device has more than three sensor elements, the diagnostic mode has then more than three time intervals.

A comparison of the power coefficients of various sensor elements can be performed, for example, based on the so-called decision coefficients DC mentioned above. The decision coefficient DC(S2,S1) between two sensor elements S1 and S2 is defined as $$DC(S_2, S_1) = \frac{PC_2 - PC_1}{PC_1}$$

wherein $PC_1$ and $PC_2$ are the power coefficients of the first and second sensor elements $S_1$ and $S_2$ with reference to a third unheated sensor element $S_3$.

Depending on whether and when a change of the thermal resistance is present for which of the at least three sensor elements, it is, in given cases, not necessary to pass through all three time intervals.

Finally, according to the invention, also a drift of the electrical resistance within at least one of the at least three sensor elements can be ascertained. A sensor element can also drift without the occurrence of a change of the thermal resistance. This leads to a change of a characteristic curve of the electrical resistance as a function of temperature of the at least one sensor element, from which a defective temperature measurement results. A change of the electrical resistance within at least one sensor element can be detected here, i.e. ascertained, using a pairwise comparison of the power coefficients and, indeed, in the unheated state of the at least one sensor element, for example, based on the phases in the determining of the temperature correction terms. When the currently measured temperature correction terms deviate from those determined in the manufacturing of the particular sensor element and, for example, furnished within the electronics unit, and the deviation exceeds a predeterminable limit value, it can be deduced from the deviation that a change of the electrical resistance has occurred. In this way, a change of the inner and outer thermal resistance and a change of the electrical resistance can be distinguished.

BRIEF DESCRIPTION OF THE DRAWINGS

The invention as well as its advantages will now be explained in greater detail based on the appended drawing, the figures of which show as follows:

FIG. 6 is: (a) temperature change as a function of time in response to an abruptly changed heating power (b) an electrical equivalent circuit diagram of a sensor element such as shown in FIG. 2;

In the figures, equal features are provided with equal reference characters. The apparatus of the invention bears the reference character 1 in its totality. Primes on reference characters indicate different examples of embodiments.

DETAILED DISCUSSION IN CONJUNCTION WITH THE DRAWINGS

Figure 1:
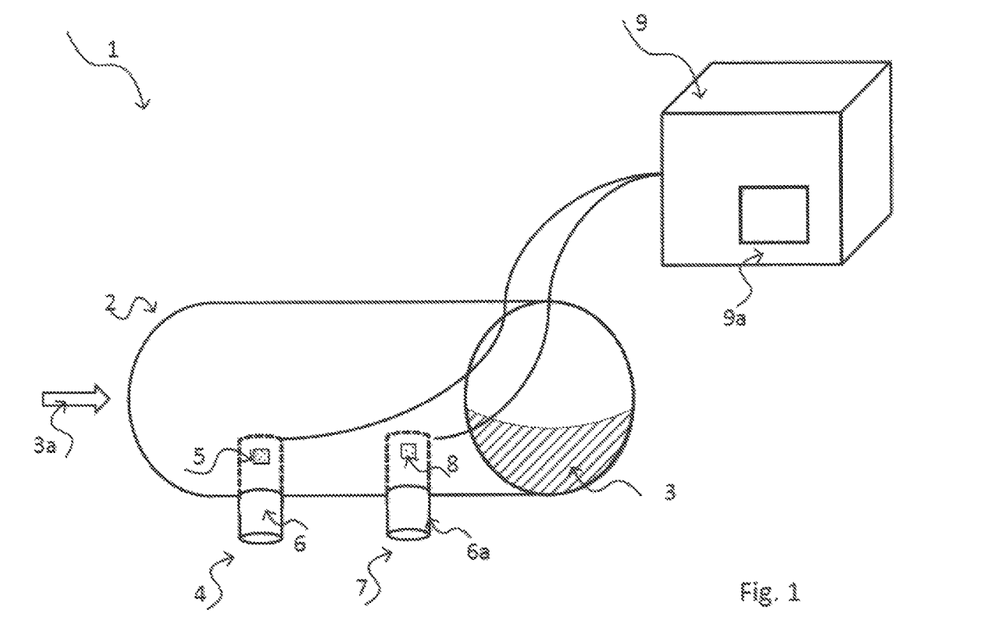
FIG. 1 is a schematic view of a thermal, flow measuring device according to the state of the art.

FIG. 1 shows a thermal, flow measuring device 1 according to the state of the art. Sealedly integrated in a pipeline 2 flowed through by a medium 3 are two sensor elements 4,7, in such a manner that they are at least partially and at least at times in thermal contact with the medium 3. Each of the two sensor elements 4,7 includes a housing 6,6*a*, which, in this case, is embodied cylindrically, and in which are arranged respective temperature sensors 5,8. Especially, the two temperature sensors 5,8, of each of the two sensor elements 4,7 should be in thermal contact with the medium 3.

In this example, the first sensor element 4 is embodied as active sensor element such that it has a heatable temperature sensor 5. Of course, a sensor element 4 with external heating element, such as mentioned above, likewise falls within the scope of the present invention. In operation, it can correspondingly be heated to a temperature T1 by delivery of a heating power P1. The temperature sensor 8 of the second sensor element 7 is, in contrast, not heatable and serves for registering the temperature $T_M$ of the medium.

Finally, the thermal, flow measuring device 1 includes also an electronics unit 9, which serves for signal registration, -evaluation and -feeding, or power supply. Known are thermal, flow measuring devices 1 with more than two sensor elements 4,7, as well as also the most varied of geometric embodiments and arrangements of the respective sensor elements 4,7.

Shown in FIG. 2 are schematic, perspective views of two sensor elements, such as can be used, for example, for the flow measuring device shown in FIG. 1. Both are basically embodied as active sensor elements 4 and can, when required, be heated. The two housings 6, 6*a* have, in each case, the shape of a cylindrical, pin-shaped jacket. The end faces 10, 10' protrude during operation at least partially and/or at times into thermal contact with the medium 3. Used for the construction of the sensor elements 4, 4' materials are usually materials distinguished by a high thermal conductivity.

For simplification in the case of both sensor elements 4,4', the second ends lying opposite the end faces 10,10' and, for example, secured in a housing of the electronics unit or to a sensor holder are not shown. The same holds for the illustration of FIG. 1.

Figure 2A:
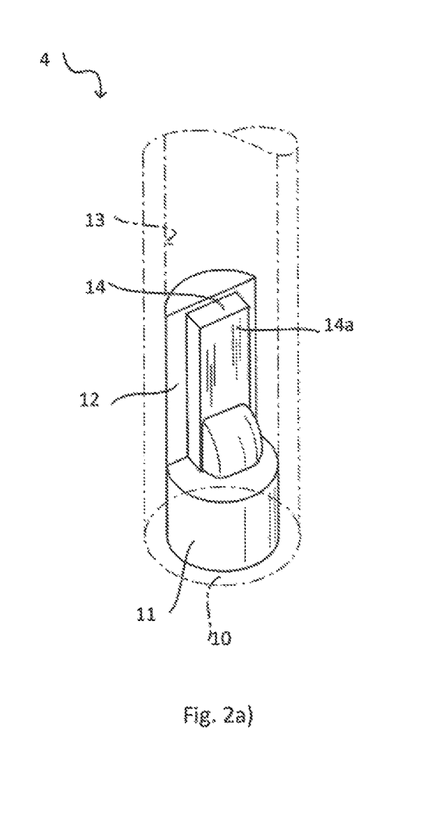
FIG. 2 are schematic drawings of two typical sensor elements.

The sensor element 4 in FIG. 2*a* is closed on its end 10 with a plug 11, which is usually joined with the housing 6 or by welding. This plug as well as a spacer 12 following thereon form in this example a one-piece, monolithic component, which is in mechanical and thermal contact with the inside 13 of the pin-shaped housing 6. There are, however, also two-part embodiments known. Soldered on the spacer 12 is, furthermore, a resistance element 14, in such a manner that a good thermal contact and correspondingly a good heat conduction are assured. The second surface 14*a* of the resistance element 14 lying opposite the soldered connection is freely exposed in this example.

Figure 2B:
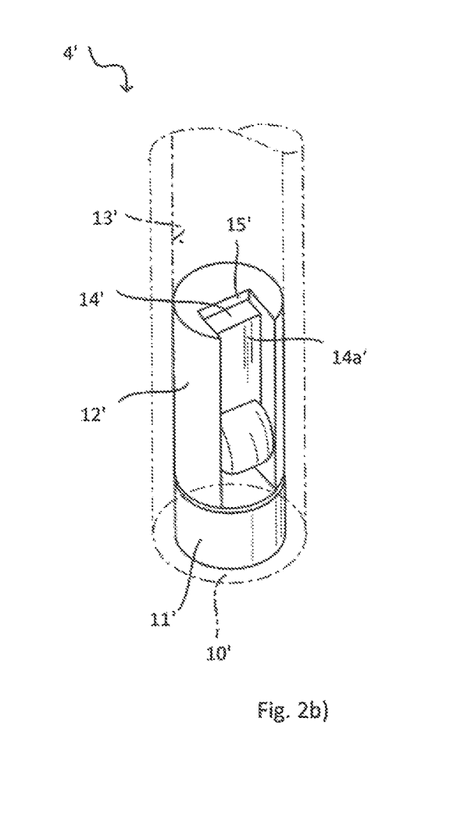

A second embodiment of a typical sensor element is shown in FIG. 2*b*. The spacer 12' forms a press fit with the housing 6' in the form a pin-shaped jacket. Usually, it is pushed, starting from the end 10', into the housing 6' by means of the plug 11' during the manufacturing. Plug 11' is then bonded to the housing 6' by welding, for example, using a laser welding method. Spacer 12' has the shape of a cylinder with a groove 15' extending along its longitudinal axis. A resistance element 14' is soldered in the groove 15'. The second surface 14*a*' of the resistance element 14' lying opposite the soldered connection is likewise freely exposed in this example.

Often, in a later manufacturing step, hollow spaces are filled with a suitable fill material (not shown) of a lesser thermal conductivity, in such a manner that, among other things, also the surfaces 14*a*, 14*a*' of the respective resistance element 14,14' lying opposite the respective soldered connections are covered by the respectively used fill material. Not shown, furthermore, are any required connecting cables.

Often, the resistance element 14,14' is a platinum element, for example, a PT10, PT100, or PT1000 element, which is arranged on a ceramic support. Frequently used for the spacer 12,12' is copper, while the housing 6, 6' is composed of stainless steel. Optionally, the housing can, moreover, be provided with a coating on the outer surface.

Figure 3:
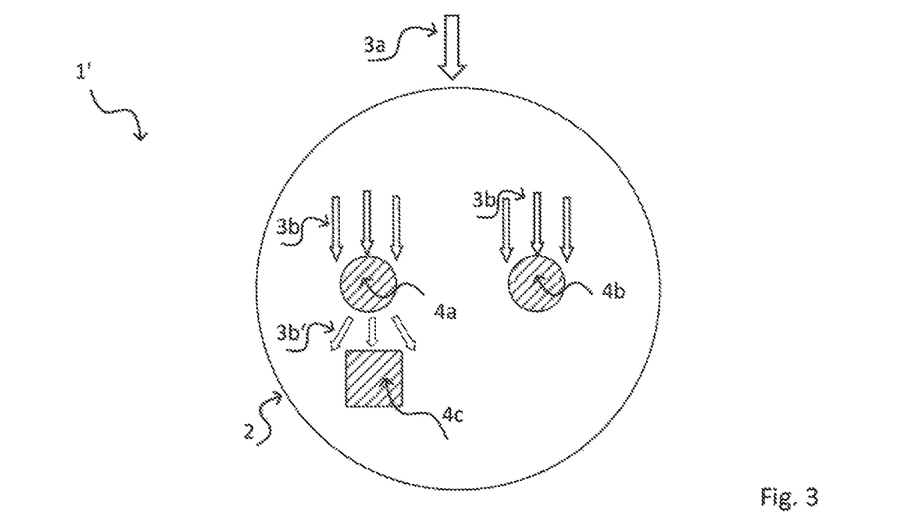
FIG. 3 is a schematic drawing of a thermal flow measuring device with three sensor elements.
Figure 4:
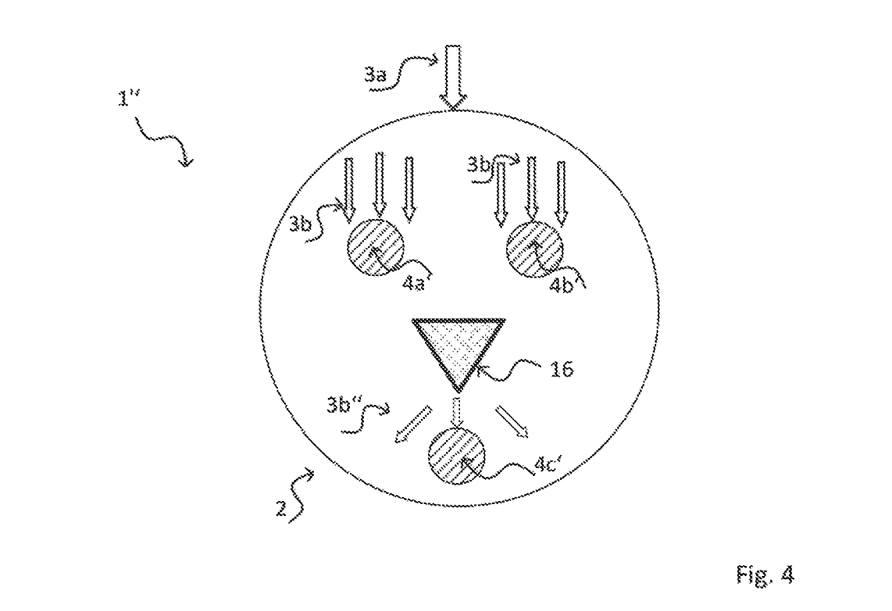
FIG. 4 is a schematic drawing of a thermal flow measuring device with three sensor elements, of which one is arranged behind a bluff body.

Shown in FIGS. 3 and 4 are two possible arrangements, or embodiments, of a thermal, flow measuring device 1 in a two-dimensional, sectional illustration through the pipeline. The macroscopic flow direction 3*a* of the medium 3 is shown by an arrow. The thermal, flow measuring device 1' of FIG. 2 includes three active sensor elements 4*a*,4*b*,4*c* containing, in each case, a heatable temperature sensor (not shown). The first sensor element 4*a* and the second sensor element 4*b* have an equal geometric embodiment with a circularly shaped cross sectional area, and are arranged at two positions 3*b* within the pipeline 2 equivalent with reference to the local flow surrounding them. The third sensor element 4*c* has a second geometric embodiment different from the first with a square-shaped cross sectional area. Moreover, the third sensor element 4*c* is arranged at a second position 3*b*' within the pipeline 2 with locally surrounding flow different from the first position 3*b*. The local flow profiles are indicated by arrows.

FIG. 4 shows a further, thermal, flow measuring device 1" in a two-dimensional, sectional illustration. The medium 3 flows in the same direction 3*a* as in the example of FIG. 2. Also, this thermal, flow measuring device 1" includes three active sensor elements 4*a*', 41*b*' and 4*c*'. Similarly as in FIG. 2, the first 4*a*' and the second 4*b*' sensor elements are arranged symmetrically on oppositely lying sides of an imaginary axis parallel to the pipeline, while the third sensor element 4*c*' is arranged on the imaginary axis, wherein between the imaginary connecting line through the first 4*a*' and second 4*b*' sensor element and the third sensor element 4*c*' a bluff body is arranged, whose separation from the third sensor element 4*c*' is less than that from the imaginary connecting line. The first sensor element 4*a*' and the second sensor element 4*b*' are, furthermore, equivalently embodied. The bluff body 16 has a triangular, cross sectional area. It is understood, however, that other geometric embodiments are possible for the bluff body 16. Bluff body 16 influences the flow profile 3*a*, so that a local flow 3*b*" results for the third sensor element 4*c*', which is changed compared with the local flows surrounding the sensor elements 4*a*' and 4*b*'.

Figure 5:
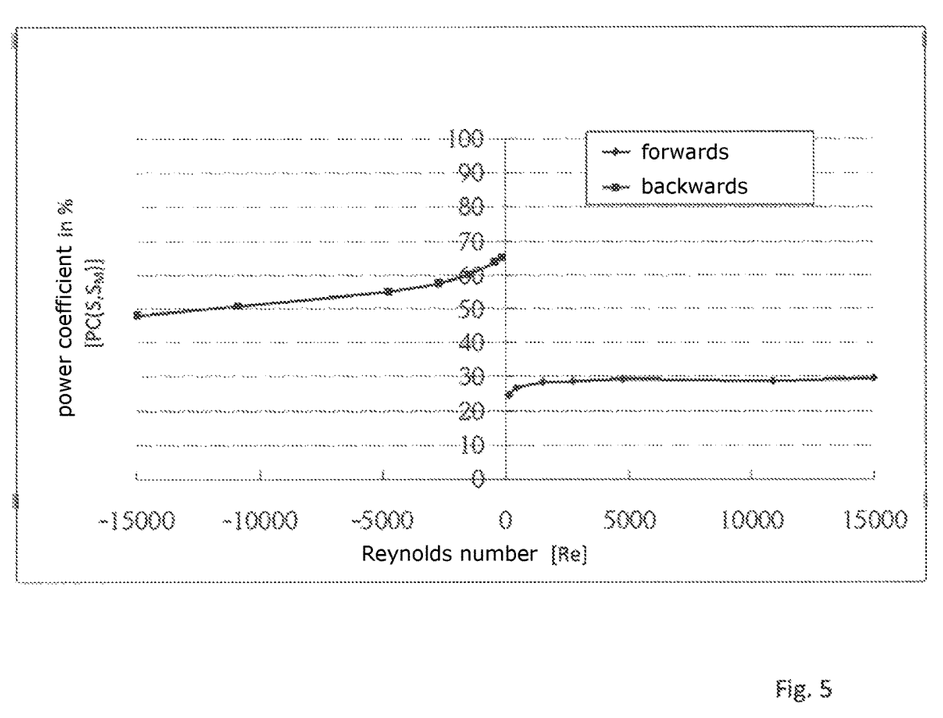
FIG. 5 is a graph of the power coefficient characteristic curves as a function of the Reynolds number in the case of different flow directions.

Different local flows 3*b*,3*b*',3*b*" surrounding the various sensor elements 4*a*,4*b*,4*c*,4*a*',41*b*',4*c*' result in different cooling rates for them. The characteristic curves or functional, determinative equations referenced for determining the mass flow and/or the flow direction differ correspondingly. Moreover, due to different arrangements within the pipeline 2 or due to different geometrical embodiment, these characteristics curves, or functional relationships likewise differ for a forwards-, or backwards, directed flow 3a. These differences enable, for example, a reliable direction detection and correspondingly a more exact ascertaining of the mass flow and/or the flow velocity. By way of example, FIG. 5 shows a characteristic curve for the power coefficient of a calibrated heated sensor element S with reference to a passive, thus non-heated, sensor element SM as a function of the Reynolds number Re for a forwards directed and for a backwards directed flow. At the point of reversal of the flow direction (Re=0), there is an abrupt change of the power coefficient. Moreover, the power coefficient for a forwards directed flow lies in the range of 20-30%, while the power coefficient for a backwards directed flow amounts to 50-60%. Correspondingly, based on this characteristic curve, the flow direction can be exactly determined, even when a sensor element exhibits only a small drift.

Figure 6A:
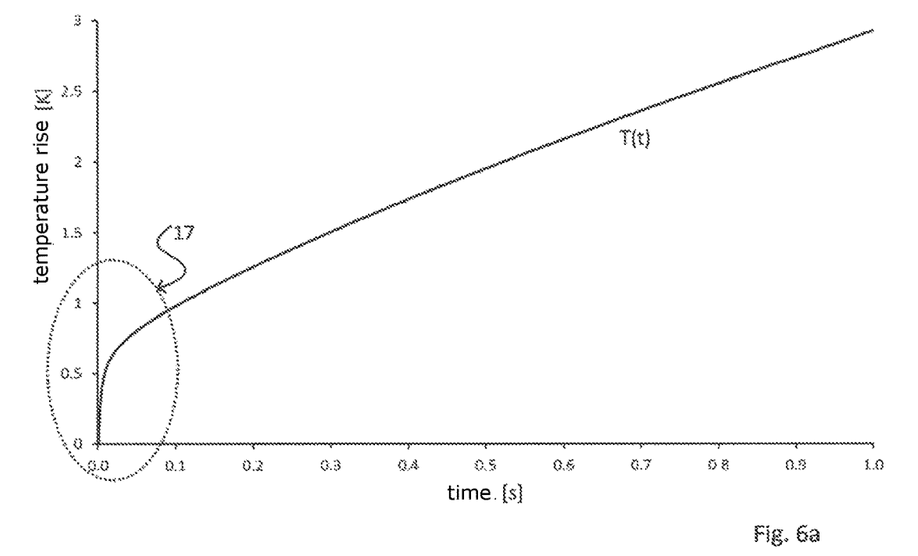

FIG. 6a shows, by way of example, temperature as a function of time in response to an abrupt change of the supplied heating power for a sensor element such as shown in FIG. 2. The following description concerns, without limitation of the generality, exclusively the evaluation of temperature as the characteristic measured variable. The respective assumptions and results can, however, be transferred, in simple manner, also to other characteristic measured variables, such as, for example, the electrical resistance.

For the point in time $t_{start}=0$, the power supplied to the at least one sensor element is abruptly changed from a first value $P_1$ to a second value $P_2$. Typically, the power jump amounts to about $\Delta P=50=500$ mW. Preferably, while performing the power jump, and the power loss on the sensor element is kept constant. Alternatively, however, also a constant electrical current- or voltage signal can be used. The temperature response caused by the power jump is then measured in suitable time intervals. The sampling rate amounts typically to ≤1 ms, in order that a sufficient number of measured values is assured for the small time interval, within which the response occurs.

Figure 6B:
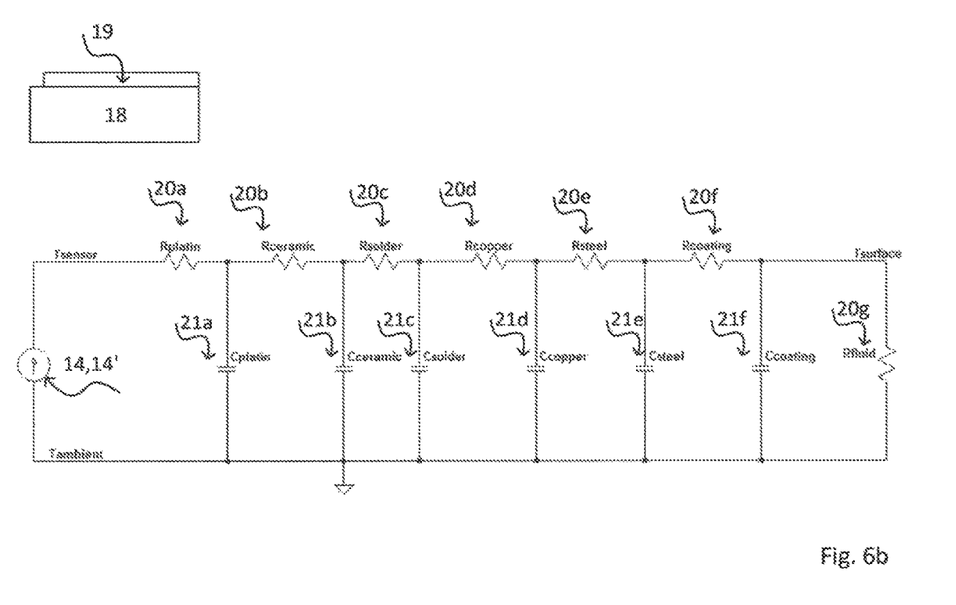

The time interval 17 of interest for analyzing the response is indicated in FIG. 6a by an encircling line. A typical time interval is, for instance, 100 ms. In this time span, the temperature change as response to the power jump is determined only by the geometric construction of the sensor element 4 as well as the heat propagation resulting within the sensor element, thus by the thermal resistances and heat capacities of the respectively used materials. The dependence of the heat transport on the individual components and material transitions can be shown, for example, by an equivalent circuit diagram, such as shown e.g. in FIG. 6b. To the left and above is a sketch of a sensor element 14,14' with integrated resistance element in the form of a platinum thin-film element 19 arranged on a ceramic support 18. Sensor element 14,14' is represented in the equivalent circuit diagram as a heat source. Each component of the sensor element is represented by an electrical resistor 20a-f and a capacitor 21a-f connected in parallel. The influence of the flowing fluid is likewise taken into consideration in the form of an electrical resistance $R_{fluid}$ 20g. For a sensor element, such as one shown in FIG. 2, there results, then, a resistor and a capacitor for the platinum element ($R_{platinum}$, $C_{platinum}$) 20a, 21a, for the ceramic support ($R_{ceramic}$, $C_{ceramic}$) 20b, 21b, for the soldered connection ($R_{solder}$, $C_{solder}$) 20c, 21c between the resistance element 14,14' and the spacer 12,12', for the spacer 12,12' ($R_{copper}$, $C_{copper}$) 20d, 21d, for the housing 6,6' ($R_{steel}$, $C_{steel}$) 20e, 21e and, in given cases, for a coating of the housing 6,6' ($R_{coating}$, $C_{coating}$) 20f, 21f. Further noted in the equivalent circuit diagram are the temperatures on the respective components, namely the temperature of the sensor element $T_{sensor}$, the temperature of the environment $T_{ambient}$ and the temperature on the surface of the sensor element $T_{surface}$.

By choosing a measurement duration, which is less than the time required for the heat transport from the heating unit to the surface of the sensor element, it can be assured that the respectively recorded measured values, for example, for the temperature, are independent of external influences, especially independent of changes of the mass flow or the flow velocity. This enables advantageously that the diagnostic function can be performed in the ongoing operation of the flow measuring device. Ideally, the diagnostic function can even be performed in parallel with determining the mass flow and/or the flow velocity.

For diagnosing the functional ability of the at least one sensor element, ideally, the first derivative, or the gradient, of the temperature is considered. In the present example, thus, the rate of increase of the temperature is analyzed. This changes with sensor drift. If the sensor drift is brought about only by a change of the inner thermal resistance, then the rate of increase of the temperature changes with changes of the inner thermal resistances and/or capacitances according to the equivalent circuit diagram of FIG. 6b. In the case, in which, for example, the resistance element 14,14' of the at least one sensor element 4,4' loses its bonding, the thermal resistance $R_{solder}$ between the spacer 12,12' and the resistance element 14,14' increases due to the formation of a thin air layer. Since air is a good electrical insulator with a small thermal thermal conductivity, the forming of the air layer makes the rate of increase of the temperature greater. The reason for this is that the heat outgoing from the resistance element 14,14' can no longer be transferred as rapidly to the spacer 12,12'. Correspondingly, the rate of increase of the temperature measured on the sensor element 4,4' rises. Similar considerations can be performed for each of the resistances 20a-g as well as capacitors 21a-f shown in the equivalent circuit diagram. Besides the temperature, suited as measured variable is, moreover, especially the temperature gradient normalized to the supplied heating power.

Furnished advantageously in a memory unit 9a integrated within the electronics unit 9 are then reference curves, or reference values, for characteristic, predeterminable, discrete points in time, so that the respective measured values can be compared. If a predeterminable deviation is detected between a reference and a measurement, a report and/or warning is generated and output for the customer. In such case, the allowable deviations can, in each case, be matched specifically to an application or to the particular requirements of the flow measuring device. In this way, the customer can, depending on the accuracy requirements predetermined by it, choose between different limit values for the maximum allowable deviation between a measured value and the associated reference value.

Figure 7:
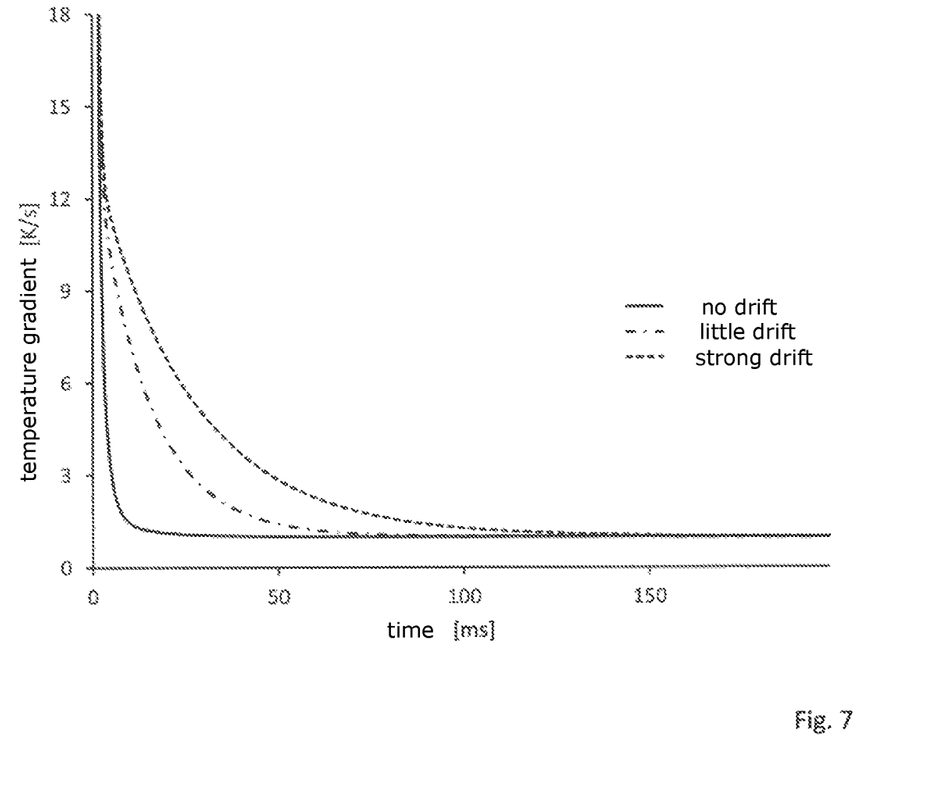
FIG. 7 is a graph showing how different changes of the inner thermal resistance lead to different temperature gradients in response to an abruptly changed heating power to a sensor element.

FIG. 7 shows, by way of example, different curves for temperature gradient as a function of time in a time interval of 100 ms after a power jump. The individual curves correspond to different, equally-constructed sensor elements, in the case of which the quality of the soldered connections between the spacer 12,12' and the resistance element 14,14' varies.

In addition to the temperature gradients, for example, the time constant τ as well as the end value $t_{end}$ of the response of the temperature as response to a power jump can be ascertained. By means of these additional variables, additional diagnoses can be made in combination with the mass flow and/or the flow velocity measurements ascertained at the same time or in the case of known external process conditions, such as, for example, during a so-called zero point measurement, by means of plausibility check relative to a desired- and actual value of the time constant τ or of the temperature rise $\Delta T = t_{end} - t_{start}$. For example, information concerning fouling, accretion-formation and/or material removal on the at least one sensor element can be derived, as based on a change of the outer thermal resistance. For this, however, likewise sensor-specific characteristic values of the time constant τ or of the temperature rise $\Delta T = t_{end} - t_{start}$ of the response as a function of the mass flow, the flow velocity or a variable mathematically related to the mass flow and/or the flow velocity must be furnished in the electronics unit.

Figure 8:
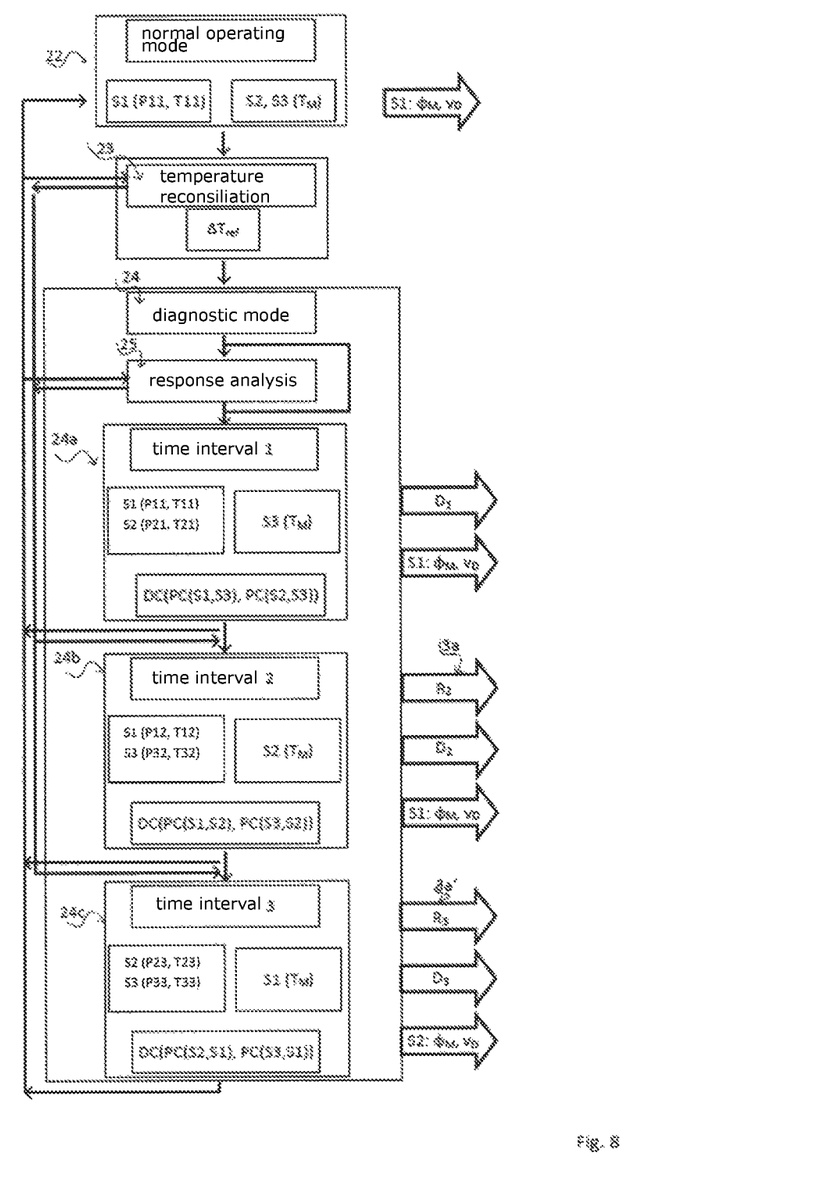
FIG. 8 is a block diagram of a possible evaluation method.

FIG. 8 shows, finally, a block diagram of an option for a method for operating a flow measuring device 1. The shown steps are for the example of a flow measuring device 1 with three sensor elements 4a,4b and 4c, especially for a flow measuring device 1" such as shown in FIG. 4. Advantageously, the mass flow, or the flow velocity, can be determined continuously and with high accuracy of measurement. Additionally, the flow direction of the medium within the pipeline can be determined and information concerning the state of at least one of the at least three sensor elements provided. Ideally, it can even be ascertained, which of the three sensor elements 4a,4b,4c exhibits a change of thermal resistance.

In the following for purposes of simplicity, the first sensor element, e.g. the sensor element referred to in FIG. 4 with 4a', is referred to with S1, the second sensor element, e.g. 4b', is referred to with S2 and the third, e.g. 4c', with S3.

In the normal operating mode 22, at least S1 is heated to a first temperature T11 by delivery of the heating power P11. S2 and S3, in contrast, remain unheated and serve for registering the temperature $T_M$ of the medium. Of course, in principle, each of the three sensor elements S1, S2, S3 can be heated, or can remain unheated in the normal operating mode 22. From the heating power P11, the temperature T11 of the heated sensor element S1 as well as the temperature $T_M$ of the medium, then the mass flow $\Phi_M$, or the flow velocity $v_F$, can be determined.

Before the so-called diagnostic mode 24 is activated, optionally a temperature reconciliation 23 can be performed. In such case, the temperatures of the two unheated sensor elements S2 and S3 are compared. In the case, in which a deviation $\Delta T_{2,3}$ of the measured values for the temperature $T_M$ of the medium obtained by means of the two sensor elements is detected, a so called temperature correction term can be ascertained and applied in all following measurements, for example, in such a manner that T(S3)+ $\Delta T_{kor,2,3}$=T(S2).

In the diagnostic mode 24, different options are available. The basic idea is to supply, in different time intervals, two of the three sensor elements with equal or different heating powers and to leave one of the sensor elements unheated. From a pairwise comparison of the temperatures and/or heating powers of the two heated sensor elements and the temperature of the unheated sensor element and/or from at least one variable derived from the temperatures and/or heating powers, then information concerning the state of at least one of the at least three sensor elements can be provided and/or a correction of the measured value for the mass flow and/or the flow velocity performed and/or a report concerning the state of at least one of the at least three sensor elements generated and output. Moreover, in the case of each change of the supplied heating power to be performed for each of the three sensor elements, an analysis 25 of the response can be performed. Alternatively, the analysis 25 of the response can also be executed only when required, wherein otherwise the diagnostic mode 24 is completed without a response analysis. By performing a response analysis 25, information can be derived concerning whether the inner or the outer thermal resistance of at least one of the sensor elements S1, S2, S3 has changed. It can thus not only be determined, which of the three sensor elements S1, S2, S3 shows a sensor drift, but, instead, also, the cause of the sensor drift. If no change of the inner thermal resistance is ascertained by means of the response analysis 25, then, for example, a change of the outer thermal resistance can be deduced.

In the block diagram shown in FIG. 8, in a first time interval 24a, S1 and S2 are heated, while S3 remains unheated. In a second (third) time interval 24b (24c), then S1 and S3 (S2 and S3) are heated, while, in turn, S2 (S1) remains unheated. Before each changing of the heated sensor elements, optionally anew a temperature reconciliation 23 can be performed, and, in given cases, a further temperature correction term $\Delta T_{kor,1,2}$ or $\Delta T_{kor,1,3}$ ascertained. These options are indicated by the arrows connecting the different intervals 24a-c and the section for the temperature reconciliation 23. Then, for example, before the first time interval 24a, a response analysis 25, such explained as based on FIGS. 5 and 6, can be performed with reference to the second sensor element S2, and, indeed, upon switching the heating power P12 on. Upon start of the second time interval 24b, in turn, a response analysis can be performed for the sensor element S2 upon turning the heating power P12 off, or for the third sensor element upon turning the heating power P32 on. Before start of the third time interval 24c, then either a response analysis can be performed with reference to the first sensor element S1 (turnoff procedure) or with reference to the second sensor element S2 (turnon procedure). These are indicated by the respective arrows between the individual time intervals 24a-c and the response analysis 25. A proviso for this procedure is that the different heating powers are, in each case, abruptly turned on or turned off, as the case may be.

An opportunity for winning information concerning the state of at least one of the at least three sensor elements based on a pairwise comparison of the temperatures and/or heating powers results from calculating the respective power coefficient PC(S1,S2), PC(S1,S3), PC(S2,S3), PC(S3,S2), PC(S3,S1) and/or PC(S2,S1) and the respective decision coefficients in each of the time intervals 13a,13b,13c. From a comparison of the different decision coefficients, in turn, it can be ascertained, for which of the three sensor elements S1, S2, S3 the thermal resistance has changed. Sometimes this may not work. Depending on size of the change of the thermal resistance of a given sensor element, either, in case the change is only small, a correction of the ascertained measured value for the mass flow $\Phi_M$ and/or the flow velocity $v_F$ can be performed. If, however, the change is greater than a predeterminable limit value, then a report concerning the state of the respective sensor element S1,S2, S3 or that the thermal resistance of at least one of the at least three sensor elements S1, S2, S3 has changed, is generated and output. In the case in which the response analysis 25 was likewise performed, it is possible, furthermore, to distinguish between a change of the inner thermal resistance and the outer thermal resistance. In the case, in which it is known, for which of the at least three sensor elements S1,S2,S3 a change of the thermal resistance has taken place, measurement operation corresponding to the normal operating mode 22 can be performed with the remaining two functional sensor elements, until the drifted sensor element is serviced.

Depending on configuration, all three time intervals 24*a-c* do not need to be performed, because, for example, either none of the sensor elements S1,S2,S3 show a change of thermal resistance, or already in the first or second time interval, it is clear, for which of the sensor elements S1, S2, S3 a change of the thermal resistance has occurred.

To the extent that all three time intervals 24*a*,24*b* and 24*c* are passed through, then three different statements of diagnostic information D1, D2 and D3 are obtained, which result from a comparison of the power coefficients ascertainable in each of the time intervals 24*a-c*, for example, based on the respective decision coefficients. In given cases, the diagnostic information D1, D2 and D3 moreover contains the results of the various response analyses 25. By comparing the diagnostic information D1, D2 and D3, it can, finally, in given cases, be ascertained, for which of the three sensor elements S1, S2 or S3 the inner or outer thermal resistance has changed. In the case of a change of the outer thermal resistance, when thus, for example, a fouling or accretion has occurred, the customer can simply, and on-site, perform a cleaning procedure, without having to replace the affected sensor element.

In the example shown here, a direction detection 3*a* is, furthermore, performed in the second 24*b* and third 24*c* time intervals of the diagnostic mode 24. Since the flow diagram shown here is tailored for a sensor of FIG. 4, the locally surrounding flow 3*b''* of S3 is different from the locally surrounding flows 3*a* of S1 and S2, so that a direction detection 3*a* can be completed most effectively, when one of the two heated sensor elements is S1 or S2 and the second heated sensor element is S3.

In the third time interval 24*c*, S2 and S3 are heated. Correspondingly, for a continuous determining of the mass flow $\Phi_M$ and/or the flow velocity $v_F$, at least for this time interval, and alternation from S1 to S2 should occur. Before the alternation, there is, consequently, an opportunity especially for a temperature reconciliation 23. Somewhat the same holds in the case, in which a change of the thermal resistance of S3 is detected. The customer should, however, in given cases, be informed by means of a report that maintenance of the thermal, flow measuring device 1 is necessary.

If there results from the diagnostic mode 24 that the (inner or outer) thermal resistance of S1 has changed, then one can switch for the normal mode 22 from S1 to S2, so that a continuing correct and exact determining of the mass flow $\Phi_M$ and/or the flow velocity $v_F$ is assured.

Depending on need of the customer, the diagnostic mode 24 and/or the direction detection 3*a* are/is activated. It is, however, likewise possible to perform the diagnostic mode 24 and/or a direction detection 3*a* continuously and in parallel with determining the mass flow $\Phi_M$ and/or the flow velocity $v_F$. Also, the customer can choose, whether the response analysis 25 should be executed within the diagnostic mode 24 continuously or only when required. The direction detection 3*a* is e.g. in FIG. 5 repeatedly performed in the time intervals 13*b* und 13*c* and the information won concerning the flow direction $R_2$ and $R_3$ can be compared, for example, with one another for checking the measurement results. In these time intervals, the third sensor element S3 arranged behind the bluff body 16 is heated, this being a feature, which is especially advantageous for the accuracy of the direction detection 3*a*. A comparison of two sensor elements arranged at equivalent positions and equally embodied does not, normally, lead to an exact direction detection.

For evaluating the diagnostic information D1, D2 and D3 won in the different time intervals 24*a-c* of the diagnostic mode 24, it can be assumed with reference to a change of the outer thermal resistance that a fouling and/or accretion formation on at least one of the three sensor elements results in a negative shifting of the respective power coefficients compared with the normal state, while the occurrence of an abrasion leads to a positive shifting.

If an arrangement and/or embodiment of the thermal, flow measuring device other than that utilized for the diagram of FIG. 8 is selected, the individual steps must, in given cases, be slightly modified. Independently of the number of sensor elements as well as their arrangement and/or embodiment, the basic procedure of changing between a normal mode 22 and a diagnostic mode 24 remains. Likewise there remains the opportunity, optionally, to perform a temperature reconciliation 23 and/or a direction detection 3*a*. Moreover, each method of the invention utilizes a pairwise comparison of the temperatures and/or heating powers of two heated sensor elements and the temperature of a third non-heated sensor element and/or a variable derived from at least one of the temperatures and/or heating powers. In such case, different sensor elements can be heated in different time intervals. Each change of the heating power supplied to one of the sensor elements can accompanied by a response analysis 25.

In its totality, a flow measuring device of the invention and/or the application of a method of the invention thus offers advantages as follows:

1) A sensor drift brought about by a change of the inner or outer, thermal resistance can be detected independently of external influences, such as, for example, a non-constant flow of the medium as a function of time
2) It can be ascertained which sensor element has a sensor drift.
3) The cause of sensor drift is detectable, i.e. it can be detected whether a change of the inner or outer thermal resistance has occurred.
4) The diagnostic function can be performed in ongoing operation, thus under process conditions.
5) No additional installations are necessary.
6) The interruption of measurement operation for performing a response analysis amounts to maximum ≈1s, in case the performing of such analysis is not, in any event, a component of the diagnostic mode; a pairwise comparison of heating powers and/or temperatures can even occur in parallel with measurement operation.
7) Evaluation of a plurality of characteristic variables associated with the response helps, in given cases, with detection of a change of the outer thermal resistance.
8) Measured value evaluation during performance of the diagnostic function is simple to implement.

The invention claimed is:

1. A method for operating, in a normal operating mode and in a diagnostic mode, a thermal, flow measuring device for determining and/or monitoring mass flow and/or flow velocity of a flowable medium through a pipeline and having at least three sensor elements and an electronics unit, wherein in the normal operating mode at least one of the at least three sensor elements is heated with a tunable heating power, and a temperature registered, and the mass flow ($\Phi M$) and/or the flow velocity (vF) of the medium is determined, and wherein in the diagnostic mode at least the following steps are performed:

a first sensor element is heated with a first heating power and a temperature of the first sensor element is registered;
a second sensor element is heated with a second heating power and a temperature of the second sensor element is registered;
the temperature of the medium is registered by means of a non-heated, third sensor element;
from the heating power and/or temperature of the first or second sensor element and/or at least one variable derived from at least one of these variables, mass flow and/or flow velocity of the medium are/is continuously determined;
from a pairwise comparison of the temperatures and/or heating powers of the first and/or second sensor element and the temperature of the third sensor element and/or from at least one variable derived from the temperatures and/or heating powers, information is derived concerning a change of the thermal resistance of at least one of the at least three sensor elements;
performing an analysis of a step response $\Delta P$ wherein
from a response to a step response $\Delta P$ of the heating power supplied to at least one of the at least three sensor elements, information is derived concerning a change of the inner thermal resistance of the at least one sensor element; and
correction of a measured value for the mass flow and/or the flow velocity is performed and/or a report concerning a state of at least one of the at least three sensor elements is generated and output;
wherein a time interval for recording the response of the temperature and/or of the resistance is selected in such a manner that it is less than a time, which a heat supplied by means of the step response of the heating power requires, in order to travel from an interior of the sensor element to a surface.

2. The method as claimed in claim 1, wherein:
a flow direction of the medium is ascertained from a pairwise comparison of the temperatures and/or heating powers and/or from at least one variable derived from the temperatures and/or heating powers.

3. The method as claimed in claim 1, wherein:
a mass flow and/or a flow velocity, a flow direction of the medium and/or information concerning the state of at least one of the at least three sensor elements are ascertained without interruption and at the same time.

4. The method as claimed in claim 1, wherein:
before a simultaneous heating of at least two of the at least three sensor elements with a tunable heating power, a reconciliation of measured media temperatures is performed, and a temperature correction term calculated and applied to all following measurements.

5. The method as claimed in claim 1, wherein:
a comparison of power coefficients of the at least three sensor elements is performed.

6. The method as claimed in claim 1, wherein:
a response of a characteristic measured variable of a sensor element dependent on the heating power, the temperature or the electrical resistance is evaluated.

7. The method as claimed in claim 6, wherein:
a response of the temperature and/or of the resistance of at least one sensor element is recorded as a function of time, by comparing a recorded response of the temperature and/or of the resistance of the at least one sensor element with at least one reference response of the temperature and/or of the resistance, a change of the thermal resistance of the at least one sensor element is deduced; and
upon exceeding of a predeterminable limit value for the change of the thermal resistance a report concerning a malfunction of at least one sensor element is generated and output.

8. The method as claimed in claim 6, wherein:
a gradient of the temperature and/or of the resistance is ascertained;
by comparing a gradient of the response of the temperature and/or of the resistance and/or a variable of the at least one sensor element derived therefrom with the gradient of at least one reference response of the temperature and/or of the resistance, a change of the thermal resistance of the at least one sensor element is deduced; and
upon exceeding of a predeterminable limit value for the change of the thermal resistance a report concerning a malfunction of at least one sensor element is generated and output.

9. The method as claimed in claim 6, wherein:
a response of the temperature or the electrical resistance is evaluated.

* * * * *